YELLOW MONOAZO DYESTUFFS

Peter Hindermann, Batterie, Basel, and Jean-Pierre Jung, Riehen, near Basel, Switzerland, assignors to J. R. Geigy A. G., Basel, Switzerland, a Swiss firm No Drawing. Application February 24, 1953, Serial No. 338,586

Claims priority, application Switzerland March 5, 1952

7 Claims. (Cl. 260—163)

The present invention concerns the production of new monoazo dyestuffs, which dye wool and similar textile fibres in yellow shades which are very fast to wet treatments and to light, from a neutral to weakly acid bath.

The making of these valuable textile fibres fast to shrinking is an important wool finishing process. Apart from newer processes this is still most easily attained technically by chlorinating the wool. Although chlorinated wool is fast to shrinking, it has the great disadvantage that with many acid dyestuffs, in particular with those which draw from a weakly acid bath and produce wet-fast dyeings, it can only be dyed very selectively and the dyeings are tippy so that uneven empty wool dyeings are obtained. It is, therefore, more advantageous to submit the previously dyed wool to a chlorinating process but this demands that the dyeings be stable to chlorine. Dyestuffs which are stable to chlorine are, therefore, very much in demand. While having good drawing power from a neutral to weakly acid bath, the new dyestuffs according to this invention not only produce dyeings which are very fast to light and to wet treatments but are distinguished from comparable known dyestuffs by better stability to chlorine.

A further subect of this invention is a new method of production of the dyestuffs by which excellent yields are obtained.

It has been found that new valuable yellow monoazo dyestuffs can be obtained if diazotized 2-aminobenzene-1-carboxylic acids or esters thereof with fatty alcohols of from 8 to 12 carbon atoms are coupled with 1-aryl-3-methyl-5-pyrazolones of the benzene and naphthalene series. The components should be so chosen that there is a sulphonic acid group in either the diazo or coupling component of the monoazo dyestuff whereupon if necessary the free carboxyl group in the dyestuff molecule is converted into the carboxylic acid halide group and this is converted into the corresponding carboxylic acid ester by reacting with fatty alcohols having from 8 to 12 carbon atoms. Monoazo dyestuffs are obtained of the general formula:

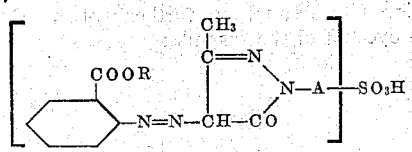

wherein R represents an aliphatic hydrocarbon radical with 8–12 carbon atoms and A represents a radical of the benzene or naphthalene series.

Diazo components usable according to this invention are obtained from the o-nitrobenzoyl halides, e. g. from o-nitrobenzoyl chloride by reacting with fatty alcohols with 8–12 carbon atoms and reducing the o-nitrobenzoic acid esters formed to the corresponding o-aminobenzoic acid esters. Diazotisation is performed by the usual methods with sodium nitrite in a mineral acid medium in the cold. The coupling with the azo components usable according to the present invention can be performed in a neutral to weakly acid medium, advantageously however in a weakly acid medium, e. g. in an acetic acid medium. Suitable coupling components are for example: 1-phenyl-3-methyl-5-pyrazolone-3'- and 4'-sulphonic acids, 1-(2'-chlorophenyl)-3-methyl-5-pyrazolone-5'-sulphonic acid, 1-(2'.5'-dichlorophenyl)-3-methyl-5-pyrazolone-4'-sulphonic acid, 1-(4'-methylphenyl)-3-methyl-5-pyrazolone-2'-sulphonic acid, 1-(2'-methyl-4'-chlorophenyl)-3-methyl-5-pyrazolone-5'-sulphonic acid, 1 - (3'.4' - dichlorophenyl) -3-methyl-5-pyrazolone-6'-sulphonic acid, 1-(naphthyl-2')-3-methyl-5-pyrazolone-6'-sulphonic acid. The dyestuffs produced according to the present invention from 1-(chlorophenyl)-3-methyl-5-pyrazolone sulphonic acids are particularly valuable because of their pure greenish-yellow shade.

It has also been found—and this is a further subject of the present invention—that dyestuffs according to the present invention of excellent purity can also be produced in very good yields from starting materials which are easily available technically, if dry monoazo dyestuffs in the form of their free acids are treated with excess thionyl chloride at a moderately high temperature. By this process only the carboxyl group is converted into the acid chloride group. The monoazo dyestuffs are produced from diazatised 2-aminobenzoic acid or its sulphonic acids, e. g. 4- or 5-sulphonic acid, by coupling with 1-aryl-3-methyl-5-pyrazolones of the benzene and naphthalene series.

If, after removal of the excess thionyl chloride, fatty alcohols with 8–12 carbon atoms are allowed to react at a raised temperature until no more hydrogen chloride is given off, the corresponding carboxylic acid esters are obtained. This reaction is carried out advantageously in an inert organic solution or suspension, e. g. in benzene, toluene or chlorobenzene. After removal of the orgaic solvent, e. g. by means of steam, and conversion of the free sulphonic acid groups into alkali salts, excellent yields of the monoazo dyestuffs according to this invention are obtained of excellent purity. Apart from the coupling components mentioned above when 2-aminobenzoic acid-sulphonic acids are used as diazo components, also 1-phenyl-3-methyl-5-pyrazolone and its halogen substituted derivatives come into consideration.

The monoazo dyestuffs according to this invention are greenish-yellow to golden yellow powders according to their composition. They dissolve in water with a yellow colour and dye wool and fibres similar thereto in shades which are very fast to light and to wet treatments even from a neutral to weakly acid dyebath.

The following examples illustrate the invention without limiting it in any way. Where not otherwise stated, parts are given as parts by weight and the temperatures are in degrees centigrade. The relationship of parts by weight to parts by volume is as that of kilogrammes to litres.

Example 1

27.7 parts of anthranilic acid-n-decyl ester are suspended in 200 parts of water and 30 parts of hydrochloric acid 30% and diazotised at 0–2° with 6.9 parts of sodium nitrite. The clear solution of the diazo compound is slowly poured into a solution of 28.85 parts of 1-(2'-chloro-5'-sulphophenyl)-3-methyl-5-pyrazolone and 32 parts of 25% aqueous ammonia in 400 part of water. The dyestuff is formed in a short time. The monoazo dyestuff of the formula:

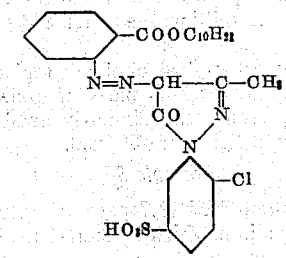

precipitates at first in gelatinous form and after stirring for several hours or adding 50 parts of potassium chloride, it becomes solid. It is filtered off, washed with 2% sodium chloride solution and dried. It is a yellow powder which dissolves in warm water and in sulphuric acid with a greenish-yellow colour. It dyes wool from a neutral to weakly acid bath in clear, greenish-yellow shades which have excellent fastness to washing and milling and very good fastness to light.

Monoazo dyestuffs which dye wool from a neutral to weakly acid bath in the same greenish-yellow shades which have similarly good fastness to washing, milling and light are obtained if 24.9 parts of anthranilic acid-n-octyl ester or 30.5 parts of anthranilic acid-n-dodecyl ester are used instead of 27.7 parts of anthranilic acid-n-decyl ester.

Anthranilic acid-n-decyl ester (B. P.$_{1.4\ mm.}$ 199–200°) is produced by reacting 185.5 parts of o-nitrobenzoyl chloride with 158 parts of n-decanol to form o-nitrobenzoic acid-n-decyl ester (B. P.$_{1\ mm.}$ 200–202°) and reducing the nitro group to the amino group, e. g. with iron and hydrochloric acid according to Béchamp. If 130 parts of n-octanol or 186 parts of n-dodecanol are used instead of 158 parts of n-decanol, then anthranilic acid-n-octyl ester (B. P.$_{0.8\ mm.}$ 175–176°) or anthranilic acid-n-dodecyl ester (B. P.$_{0.2\ mm.}$ 209–210°) respectively are obtained.

Example 2

13.7 parts of anthranilic acid are diazotised in the usual way and then added slowly dropwise at 0° to a solution which is neutral to litmus paper of 25.4 parts of 1-(4'-sulphophenyl)-3-methyl-5-pyrazolone. The monoazo dyestuff is quickly formed. The dyestuff is precipitated as free dyestuff acid by the addition of 50 parts of 30% hydrochloric acid. It is filtered off and dried. 40.2 parts of this monoazo dyestuff are added to 300 parts of thionyl chloride and converted into the corresponding monoazo dyestuff acid chloride by heating for 48 hours at 40–50°. After distilling off all the excess thionyl chloride in the vacuum, the reaction product is suspended in 160 parts of benzene, 13 parts of octanol are added and the whole is kept for several hours at 60–65° whereupon it dissolves almost completely. The benzene is distilled off and the monoazo dyestuff obtained of the formula:

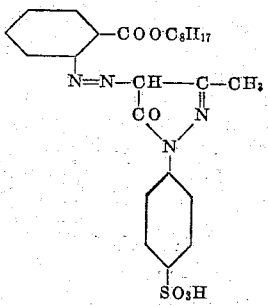

is dissolved in 1000 parts of water. The solution is made alkaline with soda and the monoazo dyestuff is precipitated therefrom with potassium chloride. It is filtered and dried in vacuo at 60°.

The dyestuff is a yellow orange powder which dissolves in warm water and in concentrated sulphuric acid with a yellow colour. It dyes wool from a neutral to weakly acid bath in reddish-yellow shades and the dyeings have very good fastness to milling, sea water and good fastness to light.

If the 13 parts of octyl alcohol are replaced by 15.8 parts of decyl alcohol or 18.6 parts of dodecyl alcohol, reddish-yellow dyestuffs with similarly good fastness to washing, milling and light are obtained.

Example 3

The diazo compound of 13.7 parts of anthranilic acid is coupled in a medium which is neutral to litmus paper with 28.85 parts of 1-(2'-chloro-5'-sulphophenyl)-3-methyl-5-pyrazolone. On completion of the coupling, 15 parts of 30% hydrochloric acid are added to the dyestuff solution, the free dyestuff acid which precipitates is filtered off, washed with acidified 2% sodium chloride solution and dried. 43.65 parts of the monoazo dyestuff so obtained are aded to 300 parts of thionyl chloride and this suspension is stirred at 35–45° for 48 hours. The excess thionyl chloride is then completely distilled off in the vacuum, the reaction product is pasted with 160 parts of benzene, 15.8 parts of decanol are added and the whole is kept at 60–65° for 24 hours. The benzene is removed with steam, and the monoazo dyestuff of the formula:

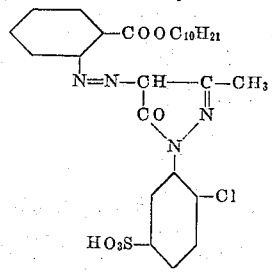

is salted out of the solution which has been made alkaline with soda, with potassium chloride.

The dyestuff is a yellow powder. It dissolves in warm water and in concentrated sulphuric acid with a greenish-yellow colour. It dyes wool from a neutral to weakly acid bath in clear greenish-yellow shades. The dyeing has very good fastness to light, milling and sea water.

If, in the above example, instead of the 28.85 parts of 1-(2'-chloro-5'-sulphophenyl)-3 - methyl - 5 - pyrazolone, 32.3 parts of 1 - (3'.4' - dichloro - 6' - sulphophenyl)-3-methyl-5-pyrazolone or 30.25 parts of 1-(2'-methyl-4'-chloro-5'-sulphophenyl)-3-methyl-5-pyrazolone are used, monozo dyestuffs are obtained which dye wool from a neutral to weakly acid bath in greenish-yellow shades. The dyeings have similarly good wet fastness and corresponding light fastness properties.

Example 4

21.7 parts of 2-aminobenzene-1-carboxylic acid-5-sulphonic acid are diazotised in the usual way and added slowly dropwise at 0° to an aqueous solution of 20.85 parts of 1-(3'-chlorophenyl)-3-methyl-5-pyrazolone in the presence of 20 parts of sodium carbonate. On completion of the coupling, the monoazo dyestuff formed is precipitated from a medium which is acid to Congo red, filtered off and dried. 43.65 parts of this monoazo dyestuff are suspended in 300 parts of thionyl chloride and the suspension is kept for 48 hours at 40–45°. The isolation of the monoazo dyestuff acid chloride formed, the reaction with decanol and further work to obtain the monoazo dyestuff of the formula:

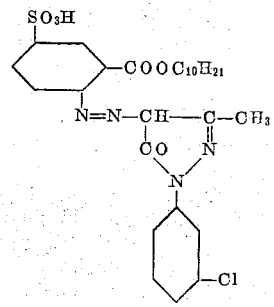

are carried out as described in Example 1. The dyestuff is a reddish-yellow powder which dissolves in warm water and in concentrated sulphuric acid with a yellow colour. Wool is dyed in reddish-yellow shades from a neutral to weakly acid bath and the dyeings have good fastness properties.

Dyestuffs with similar good qualities are obtained if 17.4 parts of 1-phenyl-3-methyl-5-pyrazolone or 18.8 parts of 1-(3'-methylphenyl)-3-methyl-5-pyrazolone are used instead of 20.85 parts of 1-(3'-chlorophenyl)-3-methyl-5-pyrazolone. Also similar dyestuffs are obtained if 21.7 parts of 2-aminobenzene-1-carboxylic acid-4-sulphonic acid are used instead of 21.7 parts of 2-aminobenzene-1-carboxylic acid-5-sulphonic acid.

*Example 5*

27.7 parts of anthranilic acid-n-decyl ester are suspended in 200 parts of water and 30 parts of 30% hydrochloric acid and diazotised at 0–2° with 6.9 parts of sodium nitrite. The clear solution of the diazo compound is poured slowly into a solution of 30.4 parts of 2-(6'-sulphonaphthyl)-3-methyl-5-pyrazolone and 32 parts of 25% aqueous ammonia in 400 parts of water. The dyestuff formation is completed in a short time. The monoazo dyestuff of the formula:

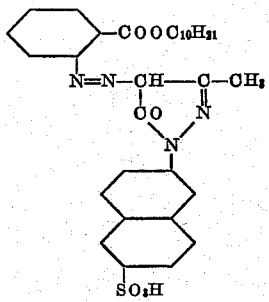

precipitates first in gelatinous form and after stirring for several hours or on the addition of 50 parts of sodium chloride, it becomes solid. It is filtered off, washed with 2% sodium chloride solution and dried. The dyestuff is a yellow-orange powder which dissolves in warm water and in concentrated sulphuric acid with a yellow colour. It dyes wool from a neutral to weakly acid bath in reddish-yellow shades and the dyeings have very good fastness to milling and sea water and good fastness to light.

A monoazo dyestuff with similar good fastness properties is obtained if 24.9 parts of anthranilic acid-n-octyl ester or 30.5 parts of anthranilic acid-n-dodecyl ester are used instead of 27.7 parts of anthranilic acid-n-decyl ester. Similar dyestuffs are also obtained if 30.4 parts of 1-(4'-sulphonaphthyl)-3-methyl-5-pyrazolone are used instead of 30.4 parts of 2-(6'-sulphonaphthyl)-3-methyl-5-pyrazolone.

*Example 6*

100 parts of wool flannel are entered at 40–45° into a dyebath containing 1 part of the dyestuff according to Example 3, 3 parts of ammonium sulphate or 5 parts of ammonium acetate and 10 parts of Glaubers salt in 3000 parts of water. The bath is gradually brought to the boil within 45 minutes, kept simmering for 30 minutes after which the goods are rinsed. A very even, greenish-yellow wool dyeing is obtained which has very good fastness to milling, sea water and light.

What we claim is:

1. A monoazo dyestuff having the general formula:

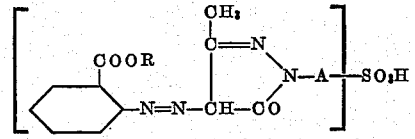

wherein R represents an aliphatic hydrocarbon radical of 8–12 carbon atoms and A represents a member selected from the group consisting of aromatic radicals of the benzene and naphthalene series.

2. A monoazo dyestuff having the general formula:

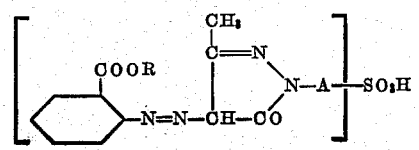

wherein R represents an aliphatic hydrocarbon radical of 8–12 carbon atoms and A represents an aromatic radical of the benzene series.

3. A monoazo dyestuff having the formula:

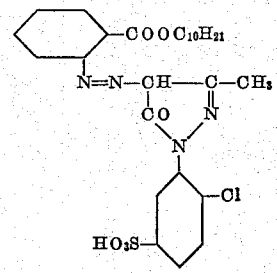

4. A monoazo dyestuff having the formula:

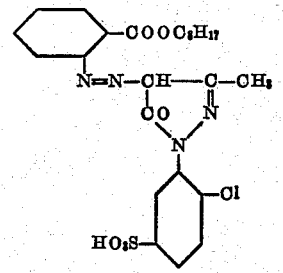

5. A monoazo dyestuff having the formula:

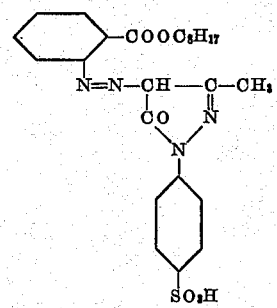

6. A monoazo dyestuff having the formula:

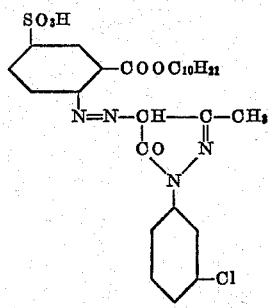

7. A monoazo dyestuff having the formula:

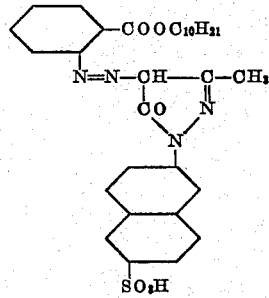

References Cited in the file of this patent

UNITED STATES PATENTS

| | | |
|---|---|---|
| 1,822,044 | Krzikalla et al. | Sept. 8, 1931 |
| 2,155,493 | Knight et al. | Apr. 25, 1939 |
| 2,393,652 | Olpin et al. | Jan. 29, 1946 |